(12) United States Patent
Barrett

(10) Patent No.: US 11,796,222 B2
(45) Date of Patent: *Oct. 24, 2023

(54) WALL MOUNTED, CONCEALED, WATER-TO-WATER, WATER SOURCE HEAT PUMP WITH DOMESTIC HOT WATER HEAT EXCHANGER AND STORAGE TANK

(71) Applicant: Robert Barrett, Bloomfield, NJ (US)

(72) Inventor: Robert Barrett, Bloomfield, NJ (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/340,042

(22) Filed: Jun. 6, 2021

(65) Prior Publication Data

US 2021/0293452 A1 Sep. 23, 2021

Related U.S. Application Data

(63) Continuation of application No. 15/867,967, filed on Jan. 11, 2018, now Pat. No. 11,041,661.

(Continued)

(51) Int. Cl.
*F24H 4/02* (2022.01)
*F25B 39/00* (2006.01)
(Continued)

(52) U.S. Cl.
CPC ........... *F24H 4/02* (2013.01); *F24D 19/1066* (2013.01); *F24H 9/06* (2013.01); *F25B 13/00* (2013.01); *F25B 39/00* (2013.01); *F24D 3/08* (2013.01); *F24D 3/18* (2013.01); *F24F 2221/183* (2013.01); *F25B 2313/003* (2013.01);
(Continued)

(58) Field of Classification Search
CPC .......... F24H 9/06; F24D 19/1066; F24D 3/18; F24D 3/08; F24F 2221/183; Y02B 30/12; F25B 2313/003; F25B 2313/0233; F25B 2313/004

See application file for complete search history.

(56) References Cited

U.S. PATENT DOCUMENTS 2,743,908 A \* 5/1956 Talman ...................... F24F 1/00
62/263
3,100,679 A \* 8/1963 Kritzer ...................... F24F 3/16
165/57

(Continued)

*Primary Examiner* — Kun Kai Ma
(74) *Attorney, Agent, or Firm* — Landmark Intellectual Property Law, LLC; Gregory M Murphy

(57) ABSTRACT

The present invention is generally directed to a system for providing heating, cooling, and domestic hot water (DHW) using a water source heat pump, the system including: a compressor; a source heat exchanger; a load heat exchanger; a DHW heat exchanger; and a DHW storage tank. In some embodiments, the system may be concealable, and mounted between two wall studs. In some embodiments, a water-to-water water source heat pump and DHW storage tank may be mounted between the same wall studs, the system having a width of no more than 14.5" and a depth of no more than 7". In some embodiments, in a heating cycle high-temperature high-pressure refrigerant in a gaseous phase is provided to both a brazed plate DHW heat exchanger and a brazed plate load heat exchanger in a parallel manner so one of the heat exchangers receives the refrigerant at a time.

8 Claims, 6 Drawing Sheets

Related U.S. Application Data

(60) Provisional application No. 62/444,844, filed on Jan. 11, 2017.

(51) Int. Cl.
*F25B 13/00* (2006.01)
*F24D 19/10* (2006.01)
*F24H 9/06* (2006.01)
*F24D 3/18* (2006.01)
*F24D 3/08* (2006.01)

(52) U.S. Cl.
CPC . *F25B 2313/004* (2013.01); *F25B 2313/0233* (2013.01); *Y02B 30/12* (2013.01)

(56) References Cited

U.S. PATENT DOCUMENTS

| | | | | |
|---|---|---|---|---|
| 4,013,120 A | * | 3/1977 | Rheinheimer | F24F 1/029 165/56 |
| 4,362,922 A | * | 12/1982 | Anderson | F24F 7/013 454/186 |
| 4,505,328 A | * | 3/1985 | Schmitt | F24F 1/022 417/372 |
| 4,544,023 A | * | 10/1985 | Marciniak | F24F 1/022 165/57 |
| 4,567,350 A | * | 1/1986 | Todd Jr. | F24H 1/102 392/489 |
| 5,769,033 A | * | 6/1998 | Petty | F28D 20/0034 122/234 |
| 9,874,014 B2 | * | 1/2018 | Reed, II | E04C 2/296 |
| 2005/0155749 A1 | * | 7/2005 | Memory | F28D 9/0075 165/167 |
| 2007/0125111 A1 | * | 6/2007 | Xiao | F24F 1/027 62/262 |
| 2009/0285567 A1 | * | 11/2009 | Searle | F24H 3/0417 392/371 |
| 2010/0180885 A1 | * | 7/2010 | Lee | F24S 20/63 126/709 |
| 2013/0014531 A1 | * | 1/2013 | Gass | F24F 5/0035 62/259.4 |
| 2015/0052914 A1 | * | 2/2015 | Leman | F25B 49/027 62/126 |
| 2017/0248323 A1 | * | 8/2017 | Thomas | F24D 3/145 |

* cited by examiner

WALL MOUNTED, CONCEALED, WATER-TO-WATER, WATER SOURCE HEAT PUMP WITH DOMESTIC HOT WATER HEAT EXCHANGER AND STORAGE TANK

RELATED APPLICATIONS

The present application is a continuation of U.S. patent application Ser. No. 15/867,967, filed 11 Jan. 2018, and entitled "Wall Mounted, Concealed, Water-to-Water, Water Source Heat Pump with Domestic Hot Water Exchange and Storage Tank," which in turn claims priority to U.S. Provisional Patent Application No. 62/444,844 entitled "Wall Hung, Concealed, Water-to-Water Source Heat Pump," filed on 11 Jan. 2017, each of which is incorporated by reference herein in its entirety.

BACKGROUND

In general, the present invention is directed to a water source heat pump (WSHP) for use in heating, ventilation, and air conditioning (HVAC) systems. More specifically, the water source heat pump may be a water-to-water heat pump that may be wall mounted and concealed between studs in a wall.

The HVAC industry has seen many systems, devices, and variations. Many if not most initial heating systems were hydronic, that is, utilized water for the transfer of heat. In early systems, steam was often utilized to provide heat. Heat pumps have been known since the mid-1800s, and have been installed in HVAC systems since approximately 1945. In general heat pumps operate to move thermal energy by absorbing heat from a cold material and releasing such heat to a warmer space. Heat pumps often utilized water or oil as a medium, continuing the trend of hydronic HVAC systems. Water source equipment may be HVAC equipment where the source side heat rejection or absorption medium is water. Such equipment may be providing cooling, heating, or a reversible cycle based on a determination of what is required at the load side.

A WSHP generally uses, at the load side, air as the medium for heat rejection and/or absorption. Typically, the compression cycle of a WSHP is reversible, allowing the system to providing heating or cooling as required. WSHP equipment is generally disposed vertically (as in a duct, closet, or mechanical room), horizontally (typically ducted in a ceiling), as a vertical stack (often used in multi-unit high-rise buildings, which may be an exposed cabinet or concealed and ducted), or as a console with an exposed cabinet. Accordingly, the use a WSHP generally requires some architectural and/or floorspace disadvantages and/or concessions.

Water-to-water water source heat pumps utilize water as a transfer medium to heat or cool water, which is then transported for use. Water is more efficient at transporting thermal energy than air, and reduces the size of HVAC systems, particularly in multi-unit buildings (e.g., apartment buildings, condominiums, dormitories, hotels, etc.). Water-to-water WSHP systems are generally square or rectangular cabinets designed to be potentially stacked and installed in a mechanical room or closet. Again, the use a water-to-water WSHP generally requires some architectural and/or floorspace disadvantages and/or concessions.

A variation to the traditional heat-pump entered the marketplace in the 1980s, known as Variable Refrigerant Flow (VRF) or Variable Refrigerant Volume (VRV) devices. Such devices generally use a refrigerant as a cooling and heating medium, along with a variable speed motor. VRF units work only at rates required, thereby increasing efficiency. Moreover, different VRF devices may utilize the same compressor, and may individually heat or cool as required. Such simultaneous heating and cooling may actually reduce the load on the compressor and increase efficiency of the overall system.

However, VRF systems generally require the use of large amounts of refrigerant, often maintained at a high pressure. Refrigerant leaks may be harmful to occupants, and accordingly it is desirable to use as little refrigerant as necessary to provide effective and efficient heat transfer. VRF systems also generally utilize outdoor air cooled condensers or remote water cooled condensers, large amounts of distributed refrigerant piping and refrigerant transfer boxes. Such systems often require more difficult and costly service, as the VRF system is spread over a large area requiring greater monitoring and maintenance. Moreover, VRF systems generally do not provide domestic hot water to each zone.

Accordingly, a wall mounted, concealed, water-to-water, water source heat pump is desirable. It is desirable to provide such a system with limited refrigerant, that is not maintained at a high pressure. It is desirable to provide a system that can quickly and efficiently switch between heating and cooling. It is desirable to provide a system that may provide domestic hot water to each zone.

It is further desirable to provide HVAC units that may be concealed within walls, including being mounted between wall studs. Besides providing for increased architectural flexibility due to reduced footprint, disposing a wall mounted, concealed water-to-water, water source heat pump inside may keep the unit safe from weather and ultraviolet damage, thereby extending the life of equipment compared to, for example, a package terminal air conditioning (PTAC) unit, or other similar thermal unit with outdoor air coils. Moreover, such a system may be fed water in a closed system, thereby keeping the system safe from sediment and debris build up.

SUMMARY OF THE INVENTION

Some aspects of the invention may include a system for providing heating, cooling, and domestic hot water using a water source heat pump, the system comprising: a compressor; a source heat exchanger; a load heat exchanger; a domestic hot water heat exchanger; and a domestic hot water storage tank.

Some aspects of the invention may include a concealable, wall-mounted system for providing heating, cooling, and hot water using a hydronic water-to-water water source heat pump with a domestic hot water heat exchanger and storage tank, the system being mounted between two (2) wall studs.

Some aspects of the invention may include a concealable, wall-mounted system for providing heating, cooling, and hot water using a hydronic water-to-water water source heat pump with a domestic hot water heat exchanger and storage tank, comprising a compressor, a source heat exchanger, a load heat exchanger, a domestic hot water heat exchanger, and a domestic hot water storage tank in fluid communication via a system of piping, wherein: in a heating cycle high-temperature high-pressure refrigerant in a gaseous phase is provided to both the domestic hot water heat exchanger and the load heat exchanger in a parallel manner such that either the domestic hot water heat exchanger or the load heat exchanger receives the high-temperature high-pressure refrigerant, after which low-temperature low-pressure refrigerant in a gaseous phase is provided to the source heat exchanger; the water-to-water water source heat pump and domestic hot water storage tank are mounted between the same two (2) wall studs; and the system has a width of no more than 14.5" and a depth, including any exterior insulation, of no more than seven (7) inches mounted between two (2) wall studs.

These and other aspects will become apparent from the following description of the invention taken in conjunction with the following drawings, although variations and modifications may be effectuated without departing from the scope of the novel concepts of the invention.

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
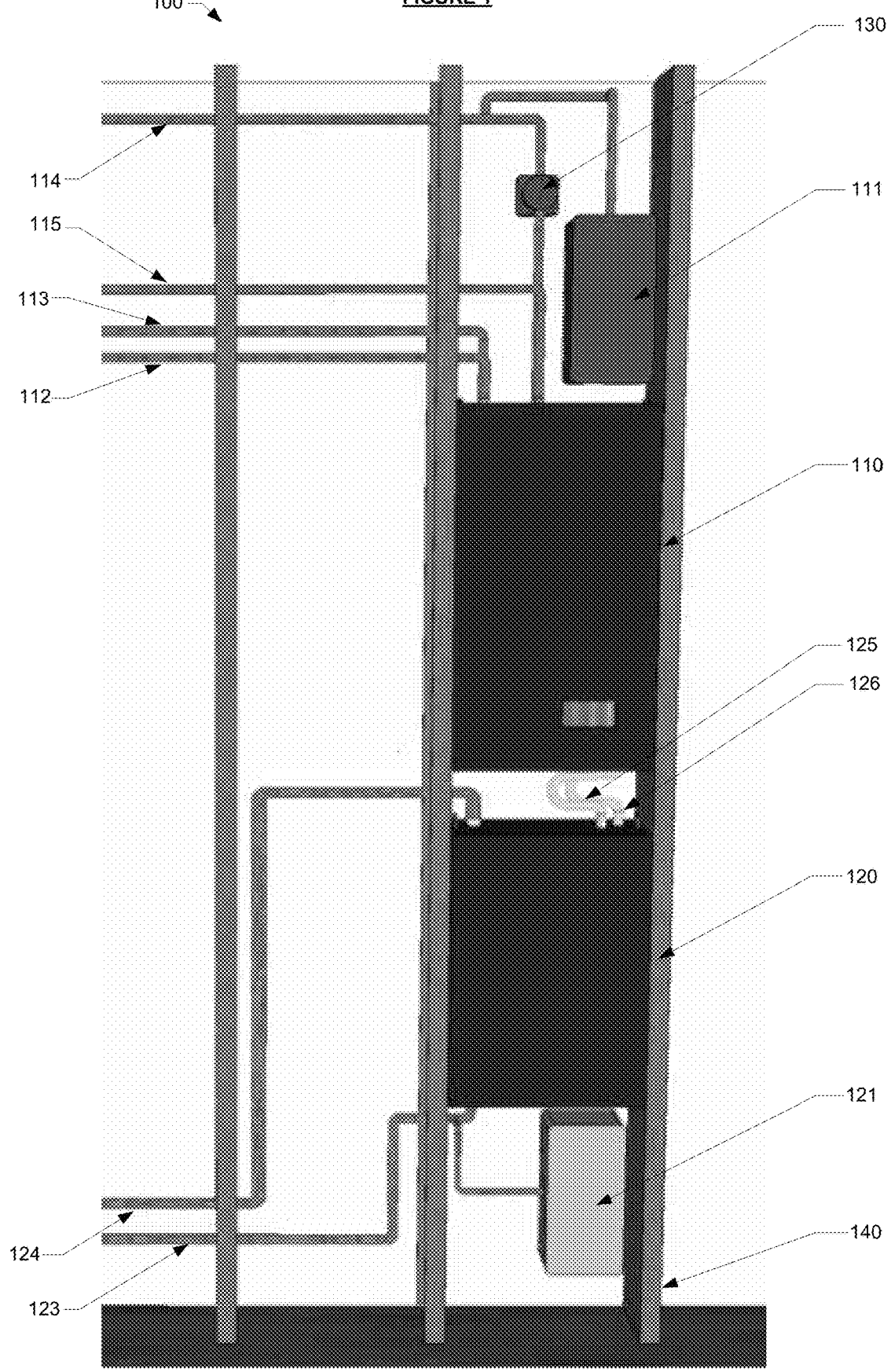
FIG. 1 illustrates a cut-away wall with an exemplary water-to-water WSHP with optional DHW heat exchanger and storage tank, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

As noted above, the present invention is generally directed to a water source heat pump (WSHP) for use in heating, ventilation, and air conditioning (HVAC) systems. More specifically, the water source heat pump may be a water-to-water heat pump that may be wall mounted and concealed between studs in a wall.

Such as system may provide numerous benefits and advantages, including but not limited to: being concealed within walls to reduce footprint and increase architectural flexibility; providing a single system that can be used for both heating and cooling; providing a safe and easily serviced system; reducing costs by using a two (2) pipe system, while still providing for quick switch between heating and cooling; reducing the amount of refrigerant used; providing for individual unit monitoring and control, thereby transferring cost for majority of energy consumed to individual tenants; integrating with a domestic hot water system, thereby eliminating or reducing the need for a centralized domestic hot water plant, piping, and recirculation lines; and/or eliminates or reduces the need for multiple domestic hot water pressure zones in high-rise building applications. Some embodiments of the present invention may be used to retrofit existing buildings, and utilize some hydronic components existing in the building (such as radiators, piping, etc.). For both new builds and retrofits, use of the present invention may reduce initial capital expenditure (CAPEX), and increased efficiencies may reduce operating expenses (OPEX).

Because a WSHP system may rely on a supplemental boiler or ground source system to provide source heat that can be absorbed by the WSHP system—rather than absorbing heat from an outdoor environment like a VRF system—WSHP systems may provide greater efficiencies and operation during particularly cold or hot temperatures.

Moreover, pairing some embodiments of the present invention with a roof mounted, air cooled, absorption heat pump plant acting as a heat-rejecting source may eliminate or reduce the need for cooling towers, boiler plants, and/or mechanical space for each such component. An air cooled absorption heat pump plant may also operate with cooler source temperatures in the summer and warmer source temperature in the winter, thereby potentially allowing all of the WSHPs in a building to operate with substantially higher efficiencies.

In accordance with some embodiments of the present invention, pairing a WSHP with a domestic hot water (DHW) system may also be easily accomplished. Adding a heat exchanger and diverting valve to a WSHP system may enable the WSHP to provide heat to a domestic hot water storage tank. For example, it is contemplated that the present invention may provide significant CAPEX savings in large buildings that may currently rely on centralized plants with building-wide hot water distribution and DHW recirculation lines. A water-to-water WSHP with an accompanying DHW heat exchanger and local storage tank may eliminate the need for a centralized system. Accordingly, building-wide hot water distribution piping from a centralized plant to individual zones may be eliminated, as well as large domestic hot water heaters, tanks, recirculation pumps, and return piping.

Reconsidering the application of some embodiments of the present invention to large multi-zone buildings shows additional advantages and efficiencies. For example, multi-zoned plumbing systems often require working pressures of greater than 80-psig. Accordingly, such systems often require pressure reducing valves and/or heat exchangers used as pressure breaks. However, with a water-to-water WSHP, the only high pressure system would be on the HVAC side (rather than DHW), and the HVAC system can withstand up to 435-psig (due to the use of brazed plate heat exchangers). Therefore, the DHW system would only receive and handle the pressure of the cold water supply, which may be—as dictated by building codes—less than 80-psig. Some embodiments of the present invention therefore simplify multi-zone buildings by reducing building-wide piping and plants, and instead positioning an efficient system in each zone.

In accordance with some embodiments of the present invention, a wall mounted, concealed, water-to-water, WSHP with an optional DHW heat exchanger and DHW storage tank may be designed to fit between wall studs positioned at standard 16 or 24 inch centers. For example, a unit in accordance with some embodiments of the present invention may have a cabinet width of approximately six (6) inches, with a width of seven (7) inches with exterior insulation added. Insulation may be desirable to reduce heat transfer, noise, and/or vibration. It is also contemplated that additional noise and/or vibration reduction and/or isolation may be achieved through the use of rubber grommets installed between a compressor and support rails, and/or between supporting fasteners and wall studs.

DESCRIPTION OF THE INVENTION

In accordance with some embodiments of the present invention, a wall mounted, concealed, water-to-water WSHP with a DHW heat exchanger may be disposed in a cabinet approximately 14.5" in width. This width may permit installation of the WSHP between walls studs located at standard 16" centers. For a 12,000 btu/hour (or 1-ton) system, it is anticipated that a cabinet enclosing this system may be approximately 26" in height, and 6" deep. While the height is variable based on specific elements included within the system, the limited depth is desirable in order to sufficiently conceal the WSHP in a wall cavity. Note that with exterior insulation, the WSHP may have a depth of approximately 7". Note that systems with higher capacities would likely require a larger enclosure, potentially increasing in height. It is anticipated, but not required, that such cabinets may be made from galvanized steel. The cabinet may include insulation, for example (but not limited to) closed cell foam insulation that may be clued to the exterior of the cabinet (not shown in the figures). Exterior insulation may assist in reducing heat transfer as well as noise and/or vibrations.

An exemplary system in accordance with some embodiments of the present invention may include, for example, a constant or variable speed scroll compressor. The compressor may be isolated using rubber grommets, insulation blankets (for sound dampening or other attenuation).

It is contemplated that some embodiments of the present invention may utilize brazed plate heat exchangers. Such brazed plate heat exchangers may be used for load-side, source-side, and DHW heat transfer. In some embodiments, the DHW heat exchanger may be a double-wall brazed plate heat exchanger.

As noted above, in accordance with some embodiments of the present invention, a DHW tank may be included in the system. A DHW tank used in the invention may take any number of shapes or sizes, and may be comprised of various components and materials—all without deviating from the present invention. However, in accordance with some embodiments of the present invention, the DHW tank may be comprised of 316L stainless steel. Moreover, a DHW tank may comprise internal baffles in order to enhance thermal stratification, increase rigidity of the tank, and assist in manufacturing. Note that a DHW recirculation pump may be selected from any pump that provides adequate capacity and performance.

It is contemplated that a DHW storage tank may be approximately 14.5" wide and 6" deep. Such dimensions may allow the DHW storage tank to be wall mounted and concealed along with the WSHP. In accordance with some embodiments, the DHW storage tank may be installed between the same two studs as the WSHP, though it is also contemplated that the DHW storage tank could be installed proximate to the WSHP, or even in a slightly removed or remote location. The length of the DHW storage tank may vary based upon the size of the unit the tank serves. For example, a studio apartment (with, for example, an anticipated capacity of two (2)) may have a length of approximately 20" (approximately a 7.5 gallon storage tank). A one bedroom unit may have a length of 30" (approximately 11.25 gallons), while a two bedroom unit may use a DHW storage tank with a length of 40" (approximately fifteen gallons).

In accordance with some embodiments of the present invention, and in accordance with FIG. 1, a system 100 comprising a wall mounted, concealed, water-to-water WSHP 110 with DHW heat exchanger and wall mounted storage tank 120 will now be discussed.

The inner workings of the water-to-water WSHP 110 will be discussed in other portions of this document. However, FIG. 1 shows how systems in accordance with some embodiments of the present invention may be installed between studs 140 set at standard distances. Note that while it is shown that the WSHP 110 and the DHW storage tank 120 are positioned between the same two (2) studs, it is also contemplated that the WSHP 110 and storage tank 120 may be placed proximate to each other, with hot water supply line 125 and cold water return 126 being run through or around mounting studs.

Additional elements of the system 100 can be seen in FIG. 1, including a HVAC expansion tank 111 and a DHW expansion tank 121. Such thermal expansion tanks 111, 121 are known in the art. System 100 may further comprise an HVAC pump 130, which may be used to provide and/or maintain adequate flow to the system 100.

FIG. 1 also illustrates at least some of the piping used in system 100. Notably, the WSHP 110 includes a source-side supply line 112 and source-side return line 113, as well as a load-side supply line 114 and load-side return line 115. DHW storage tank 120 utilizes a cold water input 123 and a hot water output 124.

Figure 2A:
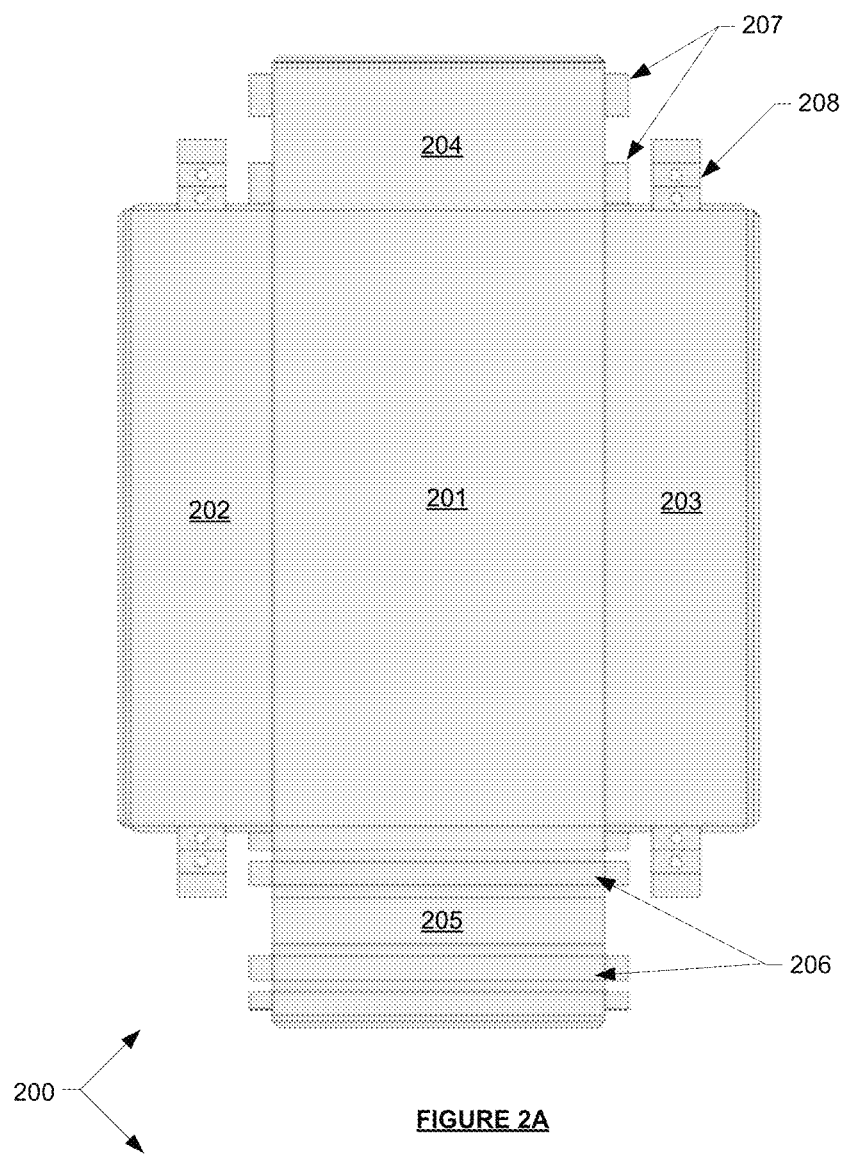
FIGS. 2A-2B depict an exemplary sheet metal blank and folding lines for a case or bank for a water-to-water WSHP with optional DHW heat exchanger and storage tank, in accordance with some embodiments of the present invention.
Figure 2B:
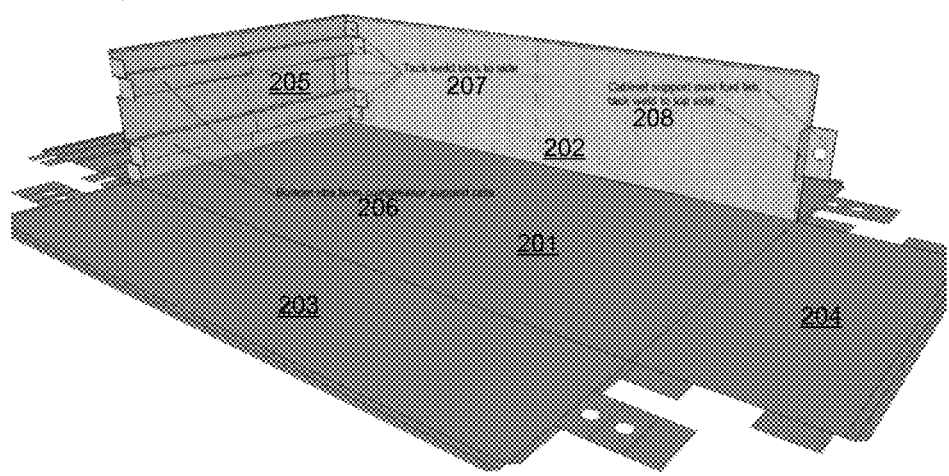

With reference to FIGS. 2A and 2B a sheet metal bank 200 for a water-to-water WSHP in accordance with some embodiments of the present invention will now be discussed. Note that the sheet metal bank 200 is configured to be folded, and form from a single piece a five (5) sided cabinet enclosure. Specifically, the sheet metal bank 200 may comprise a back panel 201, a left side panel 202, a right side panel 203, a top pane 204, and a bottom panel 205. In addition, note that the bottom panel 205 may be configured so that rails 206 may be folded into the shape. The rails 206 may be used to provide both structural rigidity, but also rails upon which a compressor may rest and/or be mounted.

Note further that bank 200 may comprise overlapping tabs 207 which may be folded over and spot-welded (or attached through any other known or advantageous method, including but not limited to welding, fasteners, etc.) in order to form the cabinet shape. In accordance with some embodiments of the present invention, support tabs 208 may also be included, which may be used to mount the cabinet inside a wall, for example through attachment to wall studs.

Note that FIG. 2A shows the sheet metal bank 200 in an unfolded, flat arrangement, while FIG. 2B shows the same sheet metal bank 200 partially folded into a cabinet to receive a water-to-water WSHP, in accordance with some embodiments of the present invention.

Figure 3:
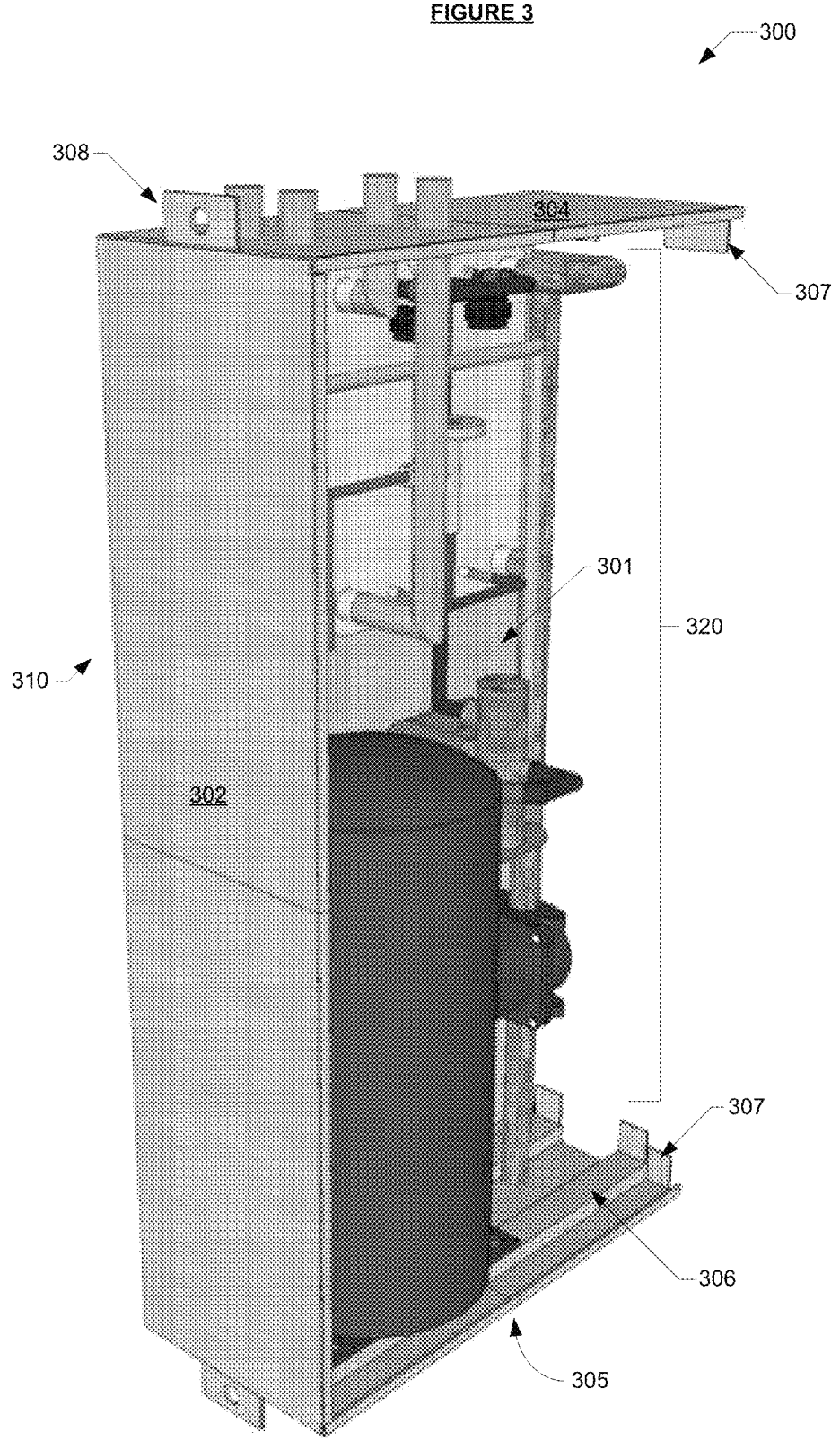
FIG. 3 illustrates an exemplary case or bank of assembled position, in accordance with some embodiments of the present invention.

FIG. 3 shows how an exemplary water-to-water WSHP 320 may be mounted in a sheet metal cabinet 310. The sheet metal cabinet 310 may comprise a back surface 301, a left side 302, a top surface 304, and a bottom surface 305. Bottom surface 305 may comprise ribs 306 for rigidity and/or to provide rails for a compressor. Tabs 307 may be tack-welded or otherwise attached to form the cabinet, and mounting tabs 308 may be formed to assist in mounting the cabinet, for example between wall studs. Note that for ease of viewing the water-to-water WSHP in FIG. 3, the right side of the cabinet is not shown. It is to be understood that typically this side would be present and formed from the sheet metal, as set forth in FIGS. 2A-2B.

Figure 4:
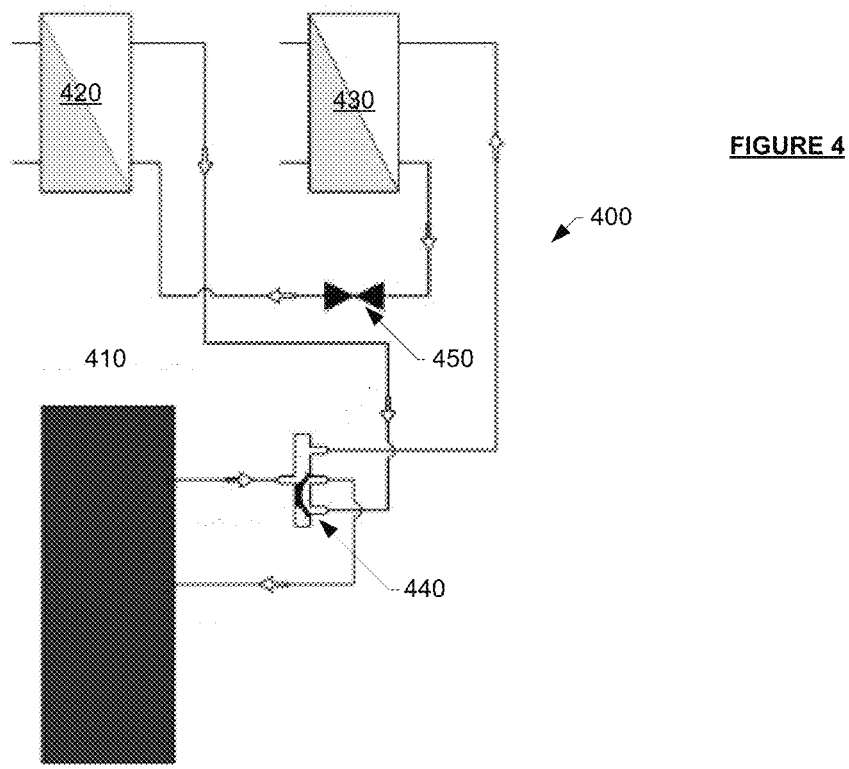
FIG. 4 illustrates a basic flow diagram or schematic of an exemplary water-to-water WSHP, in accordance with some embodiments of the present invention.

With reference to FIG. 4, an exemplary water-to-water WSHP 400 will now be discussed. FIG. 4 illustrates an exemplary schematic showing the operation of a water-to-water WSHP. The system 400 may comprise a compressor 410 which may provide a refrigerant to either a load heat exchanger 420 or a load heat exchanger 430. The system may provide heating or cooling to the load heat exchanger 420, and accordingly the refrigerant may flow through various piping in both directions. Accordingly, a reversing valve 440 may be included to allow the system to run for both heating and cooling. Note that a thermal expansion valve 450 may also be included in order to adapt to the thermal expansion of the refrigerant in the system.

Figure 5:
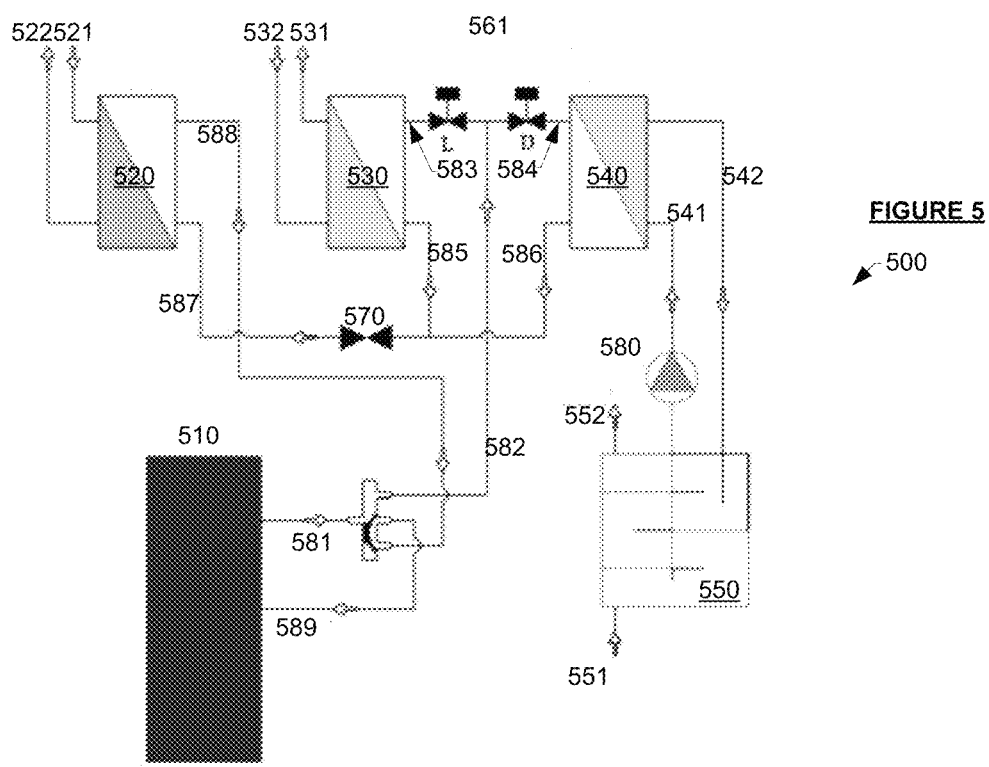
FIG. 5 illustrates a basic flow diagram or schematic of an exemplary water-to-water WSHP with optional DHW heat exchanger and storage tank, in accordance with some embodiments of the present invention.

With reference to FIG. 5, an exemplary water-to-water WSHP with a DHW heat exchanger and storage tank 500, in accordance with some embodiments of the present invention will now be discussed. The system 500 may comprise a compressor 510, in fluid communication with a load heat exchanger source, a load heat exchanger 530, and a DHW heat exchanger 540. As with the system discussed above with regards to FIG. 4, the system 500 may be able to provide both heating and cooling, and accordingly the direction of refrigerant flow may be reversed by reversing valve 560.

The source heat exchanger 520 may comprise a source supply 521 and source return 522. This may provide water to the load (for example, a radiator, baseboard heating, underfloor heating, etc.) which may heat or cool the load. In a heating cycle, the heat captured from the source may be provided to the load, while in a cooling cycle heat captured from the load may be provided to the source.

The load heat exchanger 530 may also comprise a load supply 531 and a load return 532. As the system is water-to-water, the supply and return 531, 532 may provide water to the source heat exchanger 520, where it may be either warmed or cooled by the refrigerant (depending on whether the system 500 is running in a cooling mode or a heating mode). In a heating mode, heat may be obtained from the source supply. In a cooling mode, heat may be applied to the source supply.

The DHW heat exchanger 540 may operate in a similar manner, but may comprise a hot water supply 542 running from the DHW heat exchanger and providing hot water into the DHW storage tank 550. Cold (or colder) water may be returned to the DHW heat exchanger 540 through cold water return 541. Cold water return may be provided back to the DHW heat exchanger for heating. Note that cold water return 541 may be assisted by a DHW pump 580 as needed or desirable. Domestic cold water may be provided into the storage tank at 551, and domestic hot water may be drawn off the storage tank at 552.

The system 500 may further comprise one or more thermal expansion valves 570 as needed, and may also include a reversing valve 560 and one or more solenoid valves 561 to control the flow direction of the refrigerant.

With continued reference to FIG. 5 the flow of refrigerant through various piping of system 500 will now be discussed. Compressor 510 may compress refrigerant and output refrigerant through piping 581 to reversing valve 560. The system 500 is shown in a heating arrangement, and compressed refrigerant may be sent through piping 582 to solenoid valves 561. Note that DHW heat exchanger 540 and the load heat exchanger 530 may receive refrigerant in a substantially parallel manner such that either the DHW heat exchanger 540 or the load heat exchanger 530 receives the high-temperature high-pressure refrigerant at a time.

The compressed refrigerant may be sent to both the load heat exchanger 530 and the DHW heat exchanger 540. The refrigerant may exit the load heat exchanger 530 through piping 585. Refrigerant may exit the DHW heat exchanger through 540 through piping 586. These two outputs may meet, and may be provided (potentially after flowing through thermal expansion valve 570) to piping 587 that flows into the source heat exchanger 520. The refrigerant may then flow out of the source heat exchanger 520 via piping 588 and be returned to the reversing valve 560, and provided as an input back to the compressor 510 via piping 589.

Figure 6:
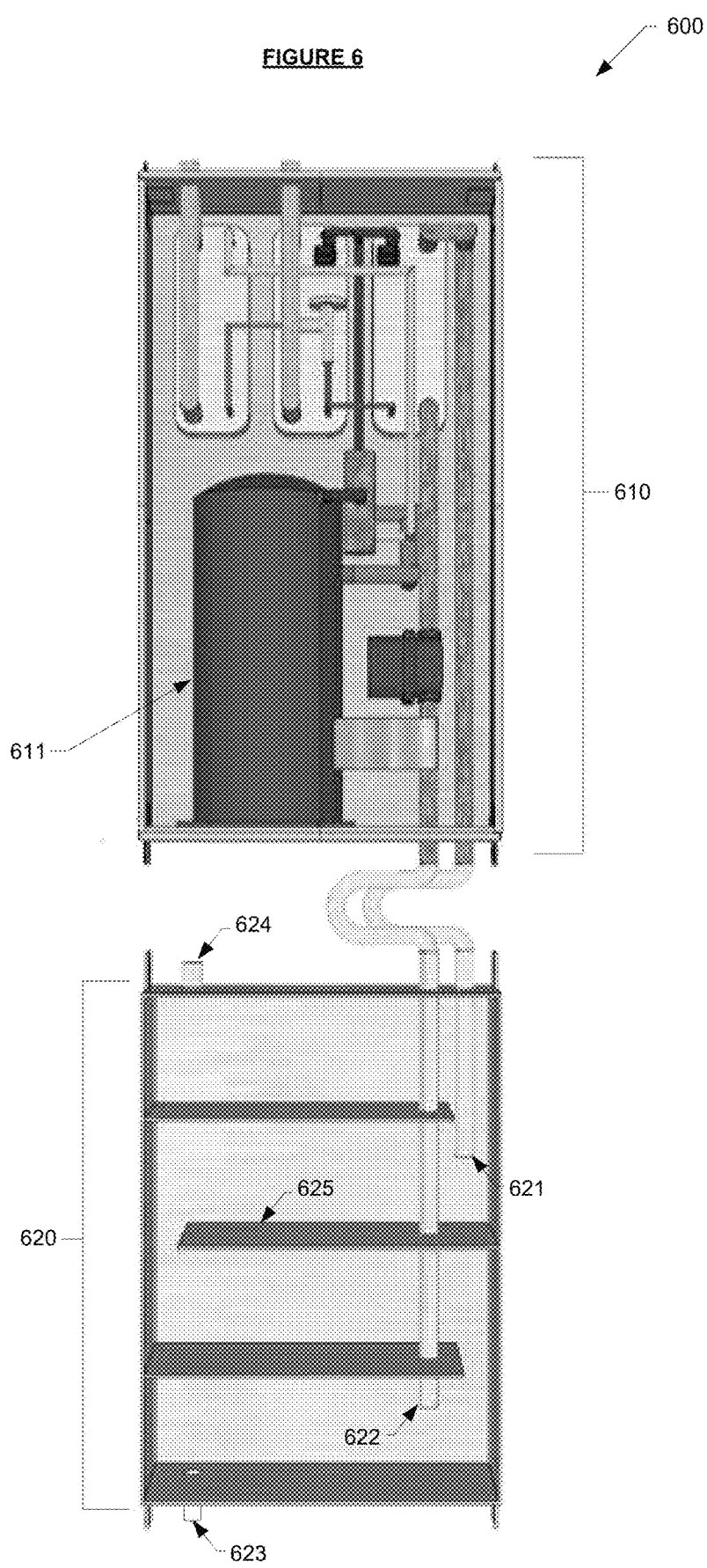
FIG. 6 depicts an exemplary a water-to-water WSHP with optional DHW heat exchanger and storage tank, in accordance with some embodiments of the present invention.

With reference to FIG. 6, an exemplary water-to-water WSHP system 600 in accordance with some embodiments of the present invention will now be discussed. System 600 may generally comprise the WSHP 610 and a DHW storage tank 620. Notably, the WSHP 610 may comprise a compressor 611, a load heat exchanger 612, a source heat exchanger 613, and a DHW heat exchanger 614. The DHW storage tank 620 may comprise hot water supply piping 621, cold water return piping 622, a domestic cold water inlet 623, and a domestic cold water output 624. In accordance with some embodiments of the present invention, the DHW storage tank 620 may include one or more baffles 625 in order to enhance thermal stratification, increase rigidity of the tank, and assist in manufacturing. Operation of the system 600 may be substantially similar to that as discussed above with regard to FIG. 5.

Figure 7:
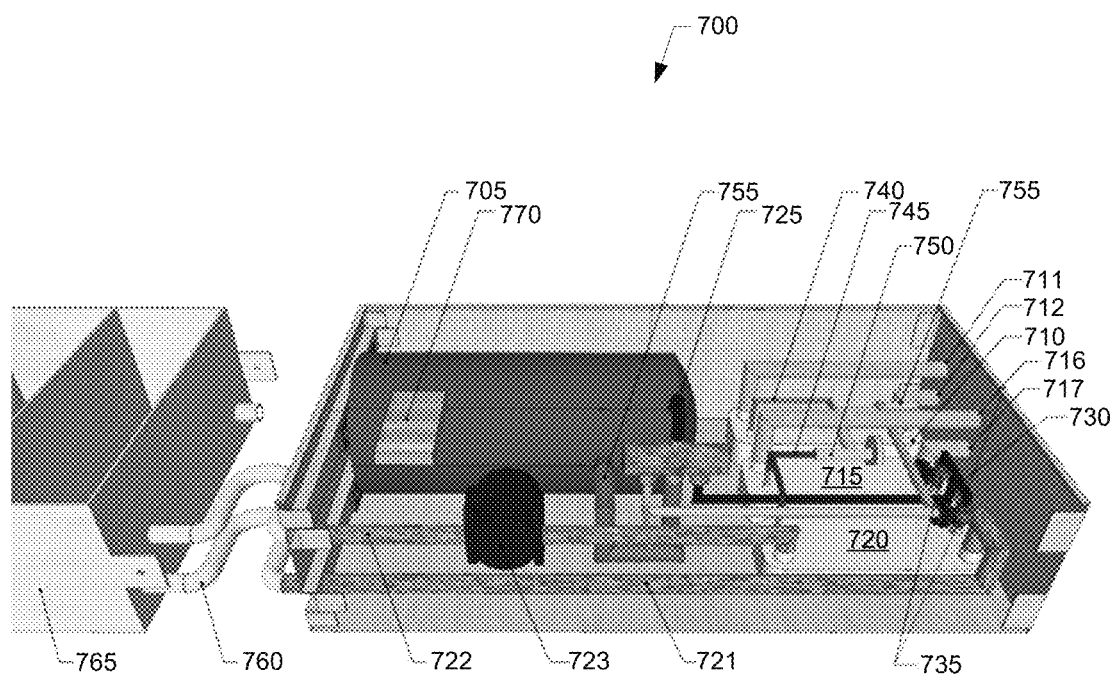
FIG. 7 illustrates an exemplary a water-to-water WSHP with optional DHW heat exchanger and storage tank, in accordance with some embodiments of the present invention.

With reference to FIG. 7 a water-to-water WSHP 700 in accordance with some embodiments of the present invention is again discussed. The operation of the system 700 is much as discussed above with regard to FIGS. 5 and 6. The system 700 may comprise a compressor 705, a source heat exchanger 710, a load heat exchanger 715, and a DHW heat exchanger 720. As before, the source heat exchanger 710 may comprise a source supply 711 and a source return 712. Similarly, the load heat exchanger may comprise a load supply 716 and a load return 717. The DHW heat exchanger 720 may comprise a DHW supply 723 that may run to a DHW storage tank 765 via, for example, a flex hose connector 760, as well as a DHW return 722 that may return cooler liquid from the DHW storage tank 765.

High temperature-high pressure (HT/HP) gas may be provided from the compressor 705 via piping 725 to a reversing valve. The HT/HP gas may then be, for example in a heating cycle, supplied via piping 730 and through one or more solenoid valves 735 to the load heat exchanger 715 or the DHW heat exchanger 720. The HT/HP gas may now be converted to a HT/HP liquid, which may be provided from the load heat exchanger 715 and DHW heat exchanger 720 via piping 745. This may flow to a thermal expansion valve 750, which may then provide a low temperature-low pressure (LT/LP) liquid via piping 740 to the source heat exchanger 710. LT/LP gas may then be returned from the load heat exchanger 710 back to the compressor 705 via piping 755.

Systems and methods in accordance with some embodiments of the present invention may operate upon receiving a call for heating or cooling. For example, a call for heating or cooling may be provided by a thermostat or a direct digital controller (DDC) system with a space sensor. Upon a call for heating or cooling, an optional solenoid valve on the source side heat exchanger may open, a flow switch may provide flow on the source side, the pump relay for the load side pump may initiate, a flow switch would provide flow on the load side. The system may then check the load side set point and determine if the compressor needed to turn on or not. If the water temperature was off the set-point, the compressor may start. The unit may cycle on/off to maintain the load side temperature supply set-point. If the unit is provided with an option variable speed compressor, the compressor motor may speed up or slow down to maintain the load side temperature set point. When the space was satisfied, the compressor may cycle off, after a time delay the pump may shut off and the solenoid valve on the source side may close.

In multi-zone systems with thermostats that respond to individual fan coil or terminal units, the system pump may remain operational whenever the system was in heating or cooling mode with the compressor cycling on/off to maintain loop temperature. The water-to-water WSHP may comprise relays to power the remote mounted system pump (of a max allowable amperage) and integral DHW pump.

For systems with the optional DHW system, the compressor may cycle on if the DHW storage tank fell below set-point. It may power the integral DHW tank circulation pump while the demand was present. The system may then give priority to the DHW system. While it is heating the DHW tank, the HVAC system may not be provided with heating or cooling. Once the DHW tank is satisfied, the system may return to HVAC control.

What is claimed is:

1. A system for providing domestic hot water using a water-to-water water source heat pump, the system comprising:
    a compressor;
    a source heat exchanger;
    a load heat exchanger;
    a domestic hot water heat exchanger; and
    piping for transporting refrigerant between the compressor, the source heat exchanger, the load heat exchanger, and the domestic hot water heat exchanger;
    wherein the system is concealed inside a single wall cavity comprising a substantially planar front wall and a substantially planar back wall, the system disposed within the wall cavity such that the system does not penetrate into the plane of the substantially planar back wall or beyond the plane of the substantially planar front wall.

2. The system of claim 1, wherein the water-to-water water source heat pump is mounted between adjacent wall studs.

3. The system of claim 1, wherein the source heat exchanger, load heat exchanger, and domestic hot water heat exchanger comprise braze plate heat exchangers.

4. A concealable, wall-mounted system for providing domestic hot water using a water-to-water water source heat pump with a domestic hot water pump and a domestic hot water storage tank, the concealable, wall-mounted system comprising a compressor, a source heat exchanger, a load heat exchanger, the domestic hot water heat exchanger, and the domestic hot water storage tank in fluid communication via a system of piping, wherein:
    the water-to-water water source heat pump and the domestic hot water storage tank are each mounted in a wall cavity and disposed within the wall cavity such that the concealable, wall-mounted system does not penetrate the wall cavity.

5. The system of claim 4, wherein the concealable, wall-mounted system is concealed inside an interior wall.

6. The system of claim 4 wherein the water-to-water source heat pump and the domestic hot water storage tank are both mounted in the same wall cavity.

7. The system of claim 4, further comprising an access panel mounted in the wall cavity to provide access for service.

8. The system of claim 4, wherein the water-to-water water source heat pump utilizes water at both a load and source side as a thermal transfer medium.

* * * * *